United States Patent
Hagel

(10) Patent No.: US 7,222,587 B2
(45) Date of Patent: May 29, 2007

(54) ACCESIBLE VIEW-IN HOUSING STRUCTURE FOR CAVITY DWELLING ANIMALS

(76) Inventor: Dennis Todd Hagel, 7602 Jefferson St., Bartonville, IL (US) 61607

( * ) Notice: Subject to any disclaimer, the term of this patent is extended or adjusted under 35 U.S.C. 154(b) by 174 days.

(21) Appl. No.: 10/248,895

(22) Filed: Feb. 27, 2003

(65) Prior Publication Data

US 2003/0159660 A1  Aug. 28, 2003

Related U.S. Application Data

(60) Provisional application No. 60/359,931, filed on Feb. 27, 2002.

(51) Int. Cl.
A01K 1/03 (2006.01)
(52) U.S. Cl. ............................ 119/482; 119/417
(58) Field of Classification Search ................ 119/482, 119/428, 435, 433, 416, 421, 418, 311, 417, 119/501
See application file for complete search history.

(56) References Cited

U.S. PATENT DOCUMENTS

| | | | |
|---|---|---|---|
| 2,430,541 A | 4/1944 | Thatcher | |
| 3,122,127 A * | 2/1964 | Shechmeister et al. | 119/417 |
| 3,792,685 A * | 2/1974 | Wiener | 119/432 |
| 4,010,888 A * | 3/1977 | Gilbert | 119/454 |
| 4,233,941 A | 11/1980 | Webster | |
| 4,361,116 A | 11/1982 | Kilham | |
| 4,453,337 A * | 6/1984 | Williams | 43/131 |
| 4,753,195 A | 6/1988 | Maggio | |
| 4,881,491 A | 11/1989 | Brown | |
| 4,928,631 A * | 5/1990 | Smith | 119/428 |
| 4,938,169 A * | 7/1990 | Barmakian | 119/622 |
| 5,016,571 A * | 5/1991 | Totaro | 119/428 |
| 5,133,291 A * | 7/1992 | Justice | 119/51.01 |
| 5,170,747 A * | 12/1992 | Strangio | 119/428 |
| 5,448,966 A * | 9/1995 | McKinnon et al. | 119/676 |
| 5,493,997 A * | 2/1996 | Ritchey | 119/428 |
| 5,495,825 A | 3/1996 | Eckelman | |
| 5,575,239 A * | 11/1996 | Bradburn et al. | 119/500 |
| 5,577,464 A * | 11/1996 | Wellington et al. | 119/475 |
| 5,634,434 A * | 6/1997 | Gibbons et al. | 119/501 |
| 5,842,438 A * | 12/1998 | Messmer | 119/165 |
| 5,881,678 A * | 3/1999 | Morley | 119/496 |
| 5,904,330 A | 5/1999 | Manico et al. | |
| 6,062,167 A | 5/2000 | Soley | |
| 6,076,485 A * | 6/2000 | Peeples et al. | 119/497 |
| 6,112,700 A * | 9/2000 | Brewer | 119/452 |

(Continued)

Primary Examiner—Teri Pham Luu
Assistant Examiner—Susan C. Alimenti
(74) Attorney, Agent, or Firm—Thompson Coburn LLP

(57) ABSTRACT

A housing structure that includes a transparent opening in one wall thereof, the opening being covered with a transparent material such as PLEXIGLAS®. This opening allows a user to view the interior of the structure and ascertain the welfare of any animals within or check for pests without opening the birdhouse and risk frightening or harming the animals. In addition, the housing structure may also include a light within such that a user can illuminate the interior thereof. This allows the user to inspect the interior of the structure when it is too dark to do so without the help of an artificial light source. Moreover, the structure may include a removable roof or side wall for easy access to the interior of the birdhouse for the purpose of cleaning and the like, or access ports that may be used to access the structure without opening.

3 Claims, 8 Drawing Sheets

U.S. PATENT DOCUMENTS

| | | | |
|---|---|---|---|
| 6,155,206 A * | 12/2000 | Godshaw | 119/453 |
| 6,182,612 B1 * | 2/2001 | Ross, Sr. | 119/482 |
| 6,311,643 B1 * | 11/2001 | Christian et al. | 119/431 |
| 6,338,315 B1 * | 1/2002 | Stillman | 119/51.01 |
| 6,390,025 B1 * | 5/2002 | Babcock et al. | 119/482 |
| 6,490,995 B2 * | 12/2002 | Greene, Jr. | 119/496 |
| 6,910,445 B1 * | 6/2005 | Manthei et al. | 119/420 |

* cited by examiner

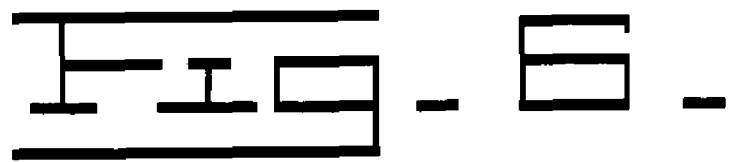
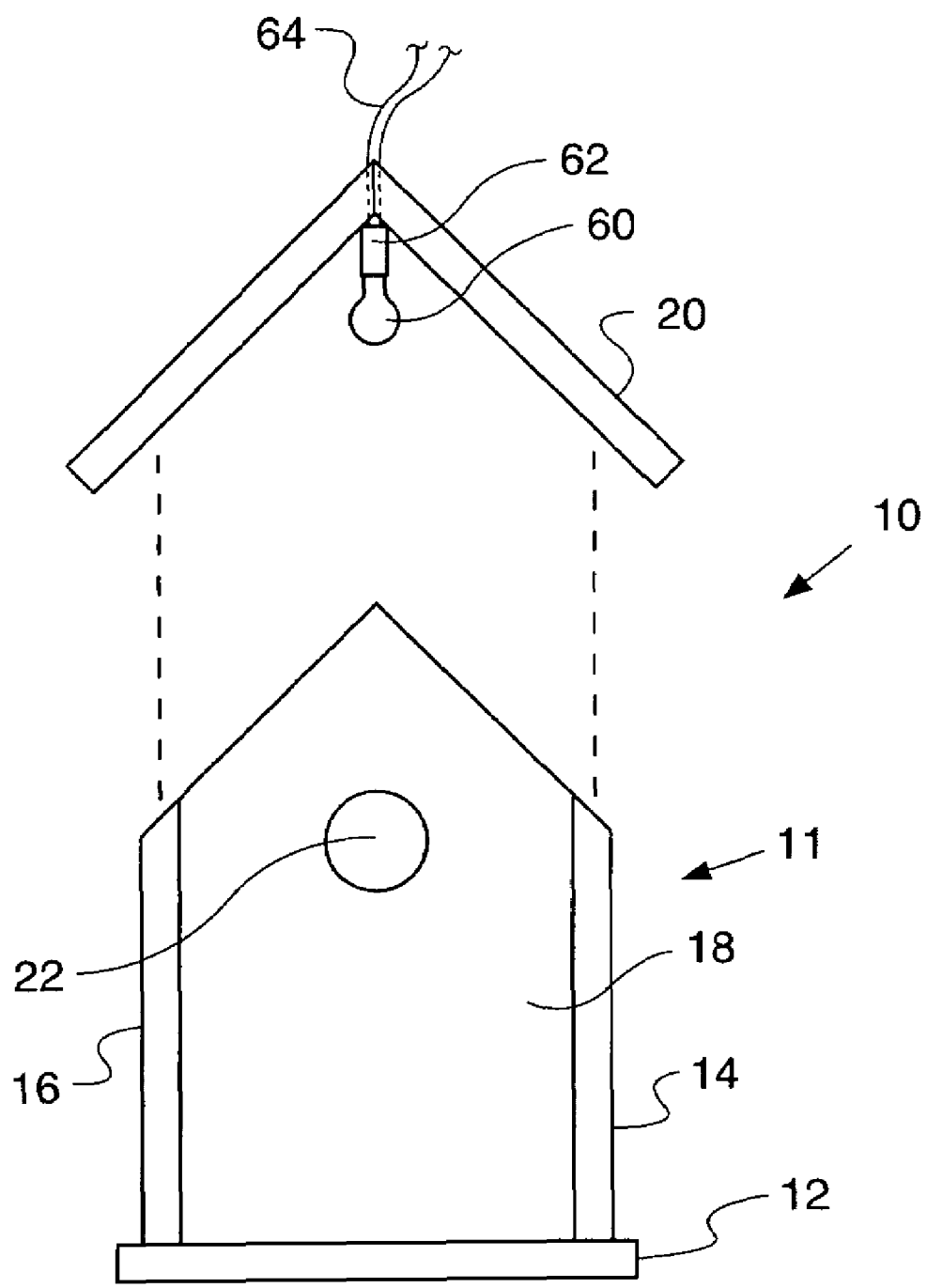

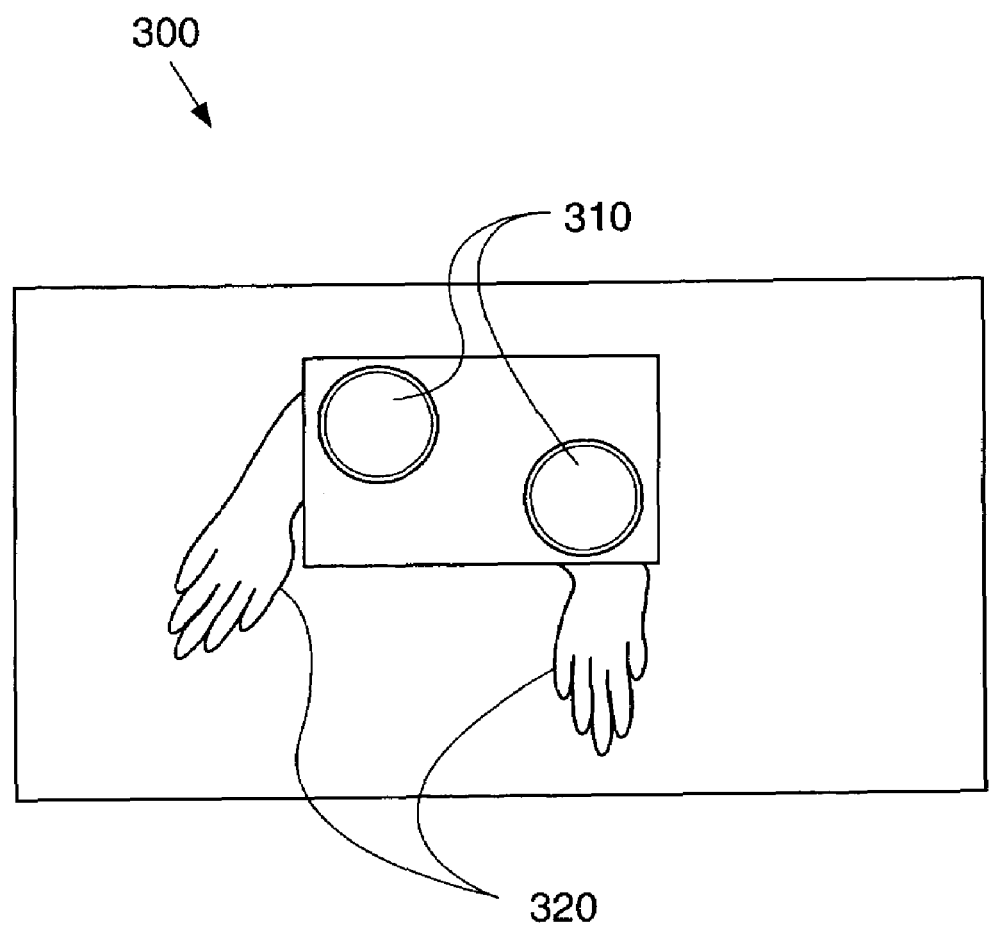

ACCESIBLE VIEW-IN HOUSING STRUCTURE FOR CAVITY DWELLING ANIMALS

CROSS REFERENCE TO RELATED APPLICATIONS

This application claims the benefit of U.S. Patent Application Ser. No. 60/359,931, filed Feb. 27, 2002 entitled BIRD HOUSE.

BACKGROUND OF INVENTION

This invention relates generally to a housing structure for cavity-dwelling animals and, more specifically, to a housing structure having a view-in window for viewing the interior thereof.

It is also necessary to monitor the interior of a birdhouse for the presence of rodents, snakes, insects and the like because the presence of such creatures can be harmful to the nesting birds or may deter birds from nesting in the first place. Snakes and rodents may attack and kill adult birds and nestlings. Many insects lay their eggs inside of birdhouses. It is, therefore, necessary to be able to identify the presence of such pests and eliminate them. Since one cannot generally view the interior of a birdhouse through the bird entrance, and physically opening the birdhouse disturbs the birds if the house is inhabited, it is common to lightly tap a birdhouse and then listen for the sound of birds within in order to determine the welfare of the birds. Tapping on the birdhouse will disturb the birds within and is therefore not a completely desirable method of checking on the welfare of the birds. Furthermore, while tapping on a birdhouse may allow a birdwatcher to determine whether birds are living within, it may not always be an effective method of determining the presence of pests within the birdhouse, particularly if the pests are insects.

Many birds will not nest in a birdhouse that contains old nesting. It is therefore necessary to clean the interior of the birdhouse after each brood of nestlings has fledged. Regular cleaning also reduces the occurrence of insect infestations that may be harmful to birds nesting within the birdhouse. In order to properly clean the interior of a birdhouse, it is necessary that the interior of the birdhouse be accessible to the birdwatcher.

Therefore, it is desirable to provide a birdhouse that allows for easy viewing of the interior of the structure by a birdwatcher, without disturbing the birds within or risking the escape and harm of nestlings. It is also desirable to provide such a structure so that the birdwatcher can readily identify animals other than birds that may have entered the birdhouse and taken up residence inside the structure. It is further desirable to provide such a structure that is easily opened and cleaned.

In addition to the reasons provided above, there are public health and policy reasons for providing a housing structure having specific access and viewing features.

The need exists for such structures not only in relation to birds but to any cavity-dwelling animals. For example, conservation or forestry department personnel could use such housing structured to tag, monitor and protect endangered species from intruders or human tampering. In addition, DNA samples could be extracted safely from animals contained within such a structure. The Department of Homeland Security or Center for Disease Control could use such a housing structure to monitor birds or other animals that carry disease-causing organisms that might be used in a bio-terrorism attack or might otherwise threaten human health. West Nile virus, for instance, spreads through avian populations and also poses a risk to human health. There is a need for a housing structure in which birds carrying West Nile virus will dwell that also allow health officials to have safe access to the birds. In addition to bio-terrorism attacks specifically directed at human beings, a suitable housing structure could be used to monitor animals for reactions to attacks at lower points on the food chains, wherein the animals observed serve a warning function in much the same way as canaries once warned for the presence of gas in a mine. In order to address these and other concerns it is desirable to provide a housing structure for use with various cavity-dwelling animals that allows one to have safe access to the interior of the structure.

SUMMARY OF INVENTION

The present invention provides a housing structure for cavity-dwelling animals having a transparent opening in one wall thereof, such as a front or rear wall or side wall, with the opening being covered with a transparent material such as PLEXIGLAS®. This opening allows a user to view the interior of the housing structure and ascertain the welfare of any birds or other animals within without having to open the housing structure and risk frightening or harming the animals. The opening also allows a user to check the interior of the structure for the presence of pests.

The present invention also provides a light within the housing structure that a user can use to illuminate the interior of the house. This allows the user to inspect the interior of the structure when it is too dark to do so without the help of an artificial light source.

The present further invention provides a housing structure with a removable roof or side wall for easy access to the interior of the structure for the purpose of cleaning and the like.

Lastly, the present invention provides a housing structure for birds or other animals that allows safe access to the interior of the structure when animals or potentially harmful materials, such as microorganisms, are present.

BRIEF DESCRIPTION OF DRAWINGS

Examples of the housing structure in accordance with the present invention will now be described with reference to the drawings.

FIG. 6 is an exploded front view of an embodiment of a birdhouse constructed in accordance with the teachings of the present invention.

FIG. 9 is a side plan view of a fourth alternative embodiment of one aspect of a housing structure constructed in accordance with the teachings of the present invention.

DETAILED DESCRIPTION

Referring now to FIGS. 1 through 6, numeral 10 designates generally a housing structure constructed in accordance with the teachings of the present invention. For purposes of example only, the embodiments of the present invention shown in the figures relate to the construction of houses for ducks or other birds. The principles of the present invention can, however, be applied to the construction of a housing structure for any cavity-dwelling animal.

Figure 1:
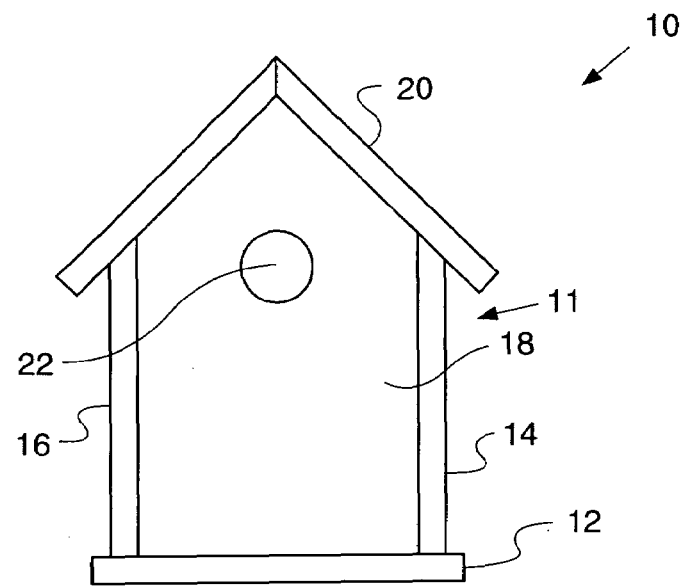
FIG. 1 is a front plan view of one embodiment of a birdhouse constructed in accordance with the teachings of the present invention.

FIG. 1 is a front plan view of an embodiment of a birdhouse constructed in accordance with the teachings of the present invention. Birdhouse 10 includes a housing unit 11, which includes a roof, four walls, and a floor. The floor of housing unit 11 is provided by a floor member 12. The lower surface of floor member 12 serves as the base of the birdhouse. The upper surface of floor member 12 serves to provide a solid floor for the interior of the birdhouse upon which birds may construct nests and the like.

Extending upwardly from floor member 12, and substantially perpendicular thereto, are side wall members 14 and 16. Side wall members 14 and 16 extend substantially along the length of floor member 12. Roof 20 contacts the upper surface of side wall members 16 and 14, enclosing the top portion of the birdhouse. Roof 20 may be constructed of a unitary piece of material, bent at a midpoint to form a "V" shape, or may be constructed of two smaller components fixedly attached so as to form a "V" shaped roof member. Front wall member 18 extends upwardly from a front portion of floor member 12 to a front portion of roof 20. Front wall member 18 has an opening 22 that is sized, shaped, and located according to the type of bird that the birdhouse is meant to attract. A rear wall (not shown) extends upwardly from a rear portion of floor member 12 to a rear portion of roof 20. The rear wall is sized and shaped substantially similar to front wall member 18, except that the rear wall preferably does not contain an opening.

The size of opening 22 may vary according to the type of bird the birdwatcher wishes to attract. For example, small birds such as chickadees or nuthatches may nest in a birdhouse having an opening 1 to 1 ¼ inches in diameter. Purple martins or woodpeckers may require an opening of 2 to 2 ¼ inches in diameter. Large birds such as barn owls may require an opening of up to 6 inches in diameter. Opening 22 should be as small as possible while still allowing the desired bird type to enter, because smaller holes make it more difficult for many predatory animals to enter the birdhouse and also discourage certain "pest" birds such as starlings.

Figure 2:
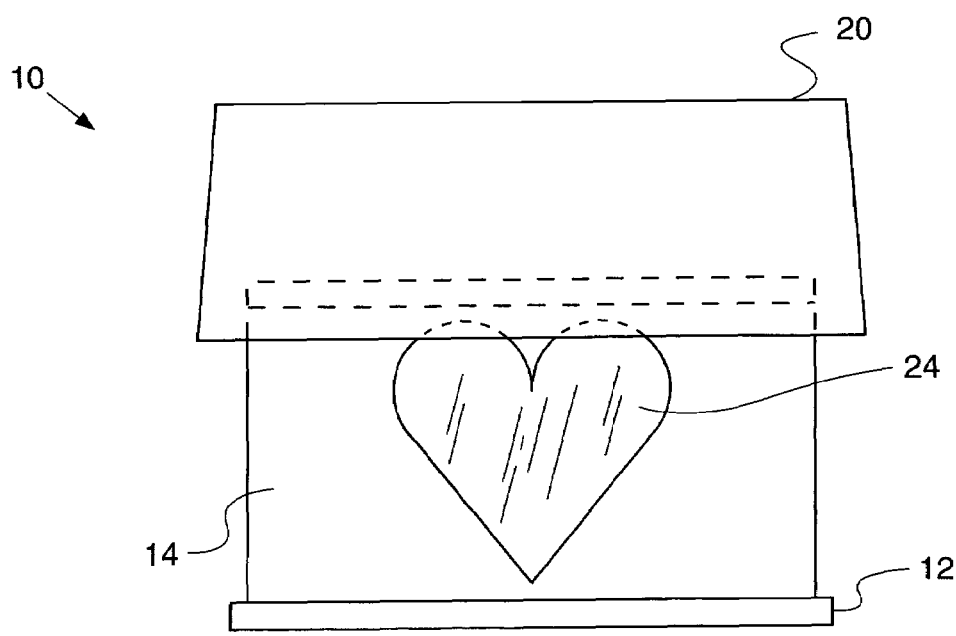
FIG. 2 is a side plan view of one embodiment of a birdhouse constructed in accordance with the teaching of the present invention.
Figure 3:
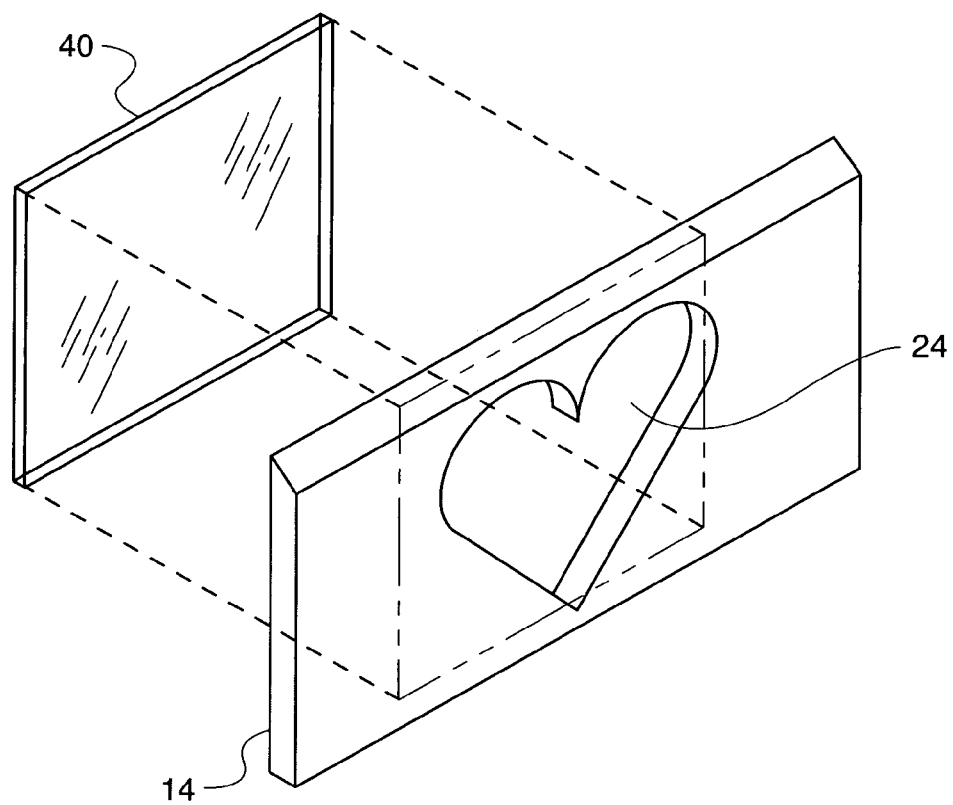
FIG. 3 is an exploded side view showing a side wall and transparent, e.g., PLEXIGLAS®, component of a birdhouse constructed in accordance with the teachings of the present invention.

FIG. 2 is a side plan view of an embodiment of a birdhouse constructed in accordance with the teachings of the present invention. An opening 24 is provided in side wall 14. Opening 24 provides a mean by which a birdwatcher can view birds inside of birdhouse 10. Opening 24 is preferably, but not necessarily, covered with a sheet of transparent material 40, as best shown in FIG. 3. The presence of the transparent material 40 prevents nestlings from falling from birdhouse 10 through opening 24 and also prevents pests and predators from entering birdhouse 10 through opening 24. This opening 24 can be of virtually any design with the illustrative embodiment being a heart design. The transparent material 40 may be secured to the inside of side wall 14 by glue or any other suitable means, such as VELCRO®, staples or brads and the like. VELCRO® is a federally registered trademark of Velcro Industries B.V., having a place of business at Castorweg 22-24, Curacao, Netherlands. If the transparent material 40 is secured to the inside of side wall 14 by glue or any other fixed adhesive, then preferably, the entire side wall 14 is removably attached from the entire birdhouse 10 with VELCRO®, staples or brads and the like. This allows for the retrofitting of conventional birdhouses. Although the transparent material 40 is preferably PLEXIGLAS®, traditional glass as well as a wide variety of transparent materials will suffice. PLEXIGLAS® is a federally registered trademark of Elf Atochem S.A., a French Corporation, having a place of business at 4/8 Cours Michelet, Puteaux, France 92800. This transparent material 40 can be etched, clear, painted, imitation stain glass among numerous other modifications in color and design.

Figure 4:
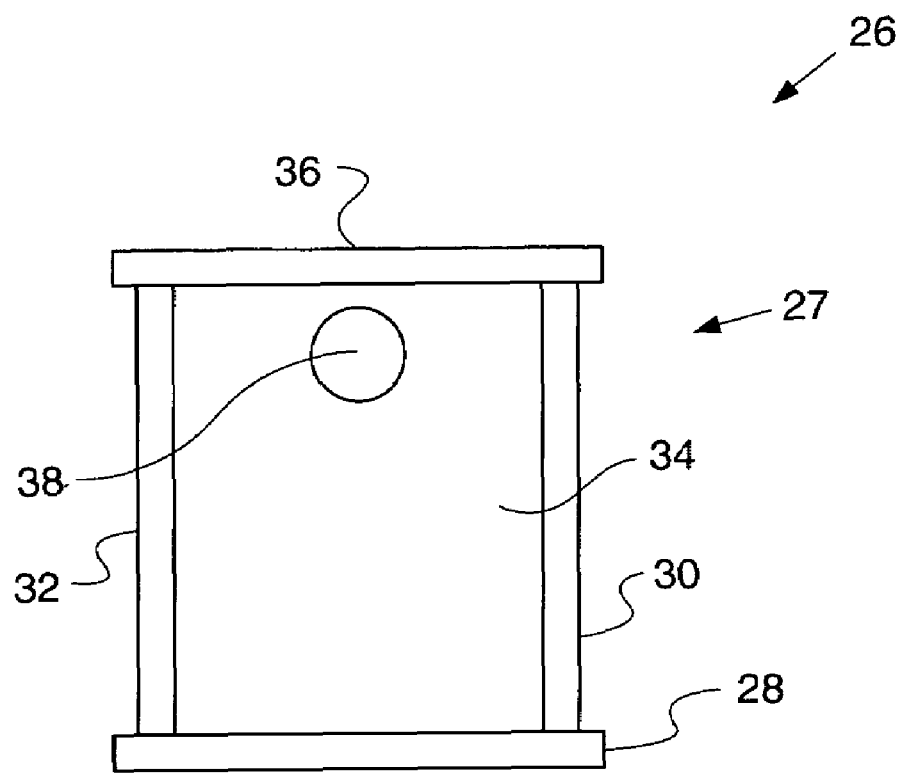
FIG. 4 is a front plan view of an alternative embodiment of a birdhouse constructed in accordance with the teachings of the present invention.

FIG. 4 is a front plan view of an alternative embodiment of a birdhouse, designated generally by numeral 26, constructed in accordance with the teachings of the present invention. Birdhouse 26 comprises a housing unit 27, which includes a roof, four walls, and a floor. The floor of housing unit 27 is provided by a floor member 28. The lower surface of floor member 28 serves as the base of the birdhouse. The upper surface of floor member 28 serves to provide a solid floor for the interior of the birdhouse.

Extending upwardly from floor member 28, and substantially perpendicular thereto, are side wall members 30 and 32. Side wall members 30 and 32 extend substantially along the length of floor member 28. Roof 36 contacts the upper surface of side wall members 30 and 32, enclosing the top portion of birdhouse 26. In this embodiment, roof 36 is a unitary, flat member positioned parallel to floor member 28 along the upper surfaces of side wall members 30 and 32. Front wall member 34 has an opening 38 that is sized, shaped, and located according to the type of bird that birdhouse 26 is meant to attract. A rear wall (not shown) extends upwardly from a portion of floor member 28 to a rear portion of roof 36. The rear wall is sized and shaped substantially similar to front wall member 34, except that the rear wall preferably does not contain an opening.

Side wall 30 is substantially similar to side wall 14, as shown in FIG. 3 and described above, having an opening 24 through which a birdwatcher may observe birds within birdhouse 26. The opening 24 of side wall 30 is also preferably, but not necessarily, covered with PLEXIGLAS® or other suitable transparent material to prevent nestlings from falling out of birdhouse 26 and to prevent predators and pests from entering.

Figure 5:
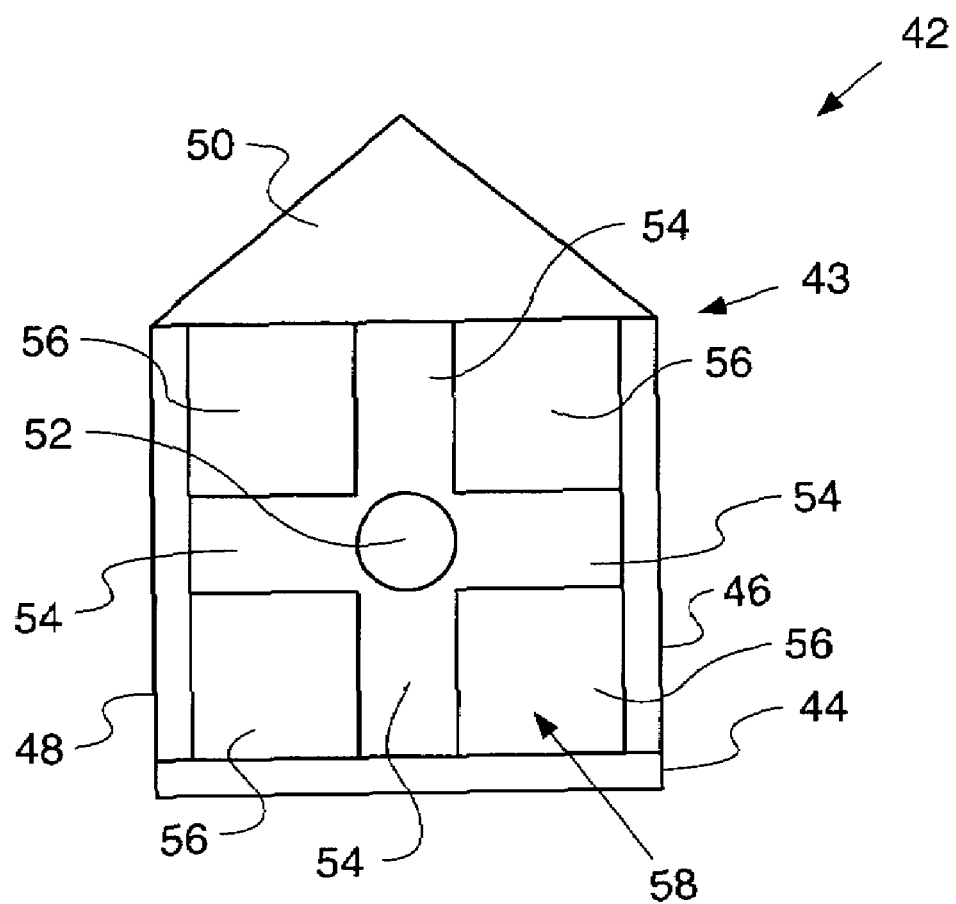
FIG. 5 is a front plan view of a second alternative embodiment of a birdhouse constructed in accordance with the teachings of the present invention.

FIG. 5 is a front plan view of a second alternative embodiment of a birdhouse, indicated generally by the numeral 42, constructed in accordance with the teachings of the present invention. Birdhouse 42 is similar in general structure to the embodiments above, essentially being a housing unit 43 comprising a floor member 44, opposing side wall members 46 and 48, a roof member 50, a front wall 58, and a rear wall (not shown). The structure of the front wall of birdhouse 42 is, however, different from the two embodiments previously described.

Front wall 58 has an opening 52 that is sized, shaped and located according to the type of bird that birdhouse 42 is meant to attract. Front wall 58, however, is constructed of a plurality of solid, opaque members 56 made of wood or other suitable materials, and a plurality of solid, transparent members 54, preferably, but not necessarily, made of PLEXIGLAS® or other transparent materials. Transparent members 54 allow a birdwatcher to view the interior of birdhouse 42, and any animals therein, from the front.

FIG. 6 is an exploded front view of the first embodiment described above of a birdhouse 10 constructed in accordance with the teachings of the present invention. Roof 20 is shown removed from the remainder of housing unit 20 so that light bulb 60, located in the interior of birdhouse 10 when birdhouse 10 is assembled, can be seen. Light bulb 60 is removably attached to socket 62, which is, in turn, attached to the underside of roof 20. A nonlimiting example of a socket 62 can include a bayonet lamp base, e.g., RADIO SHACK® Model 272-359 and a nonlimiting example of a light bulb 60 can include a bayonet lamp bulb, e.g. RADIO SHACK® Model 272-1108A.

A pair of wires 64 extends from socket 62 through an opening in roof 20 and to a power source (not shown). The presence of light bulb 60 allows a birdwatcher to illuminate the interior of birdhouse 10 for the purpose of viewing the interior thereof. The light cast by light bulb 60 produces a glare along the interior surface of transparent material 40, thus rendering any birds within birdhouse 10 incapable of seeing the birdwatcher and preventing them from becoming alarmed. The light bulb configuration shown in this embodiment may be used with any of the above embodiments of the present invention. Moreover, any of a wide variety of light bulbs and associated power supplies may be utilized with the present invention. Also, more than one light bulb 60 can be located within the birdhouse 10 in a wide variety of locations and configurations.

Figure 7:
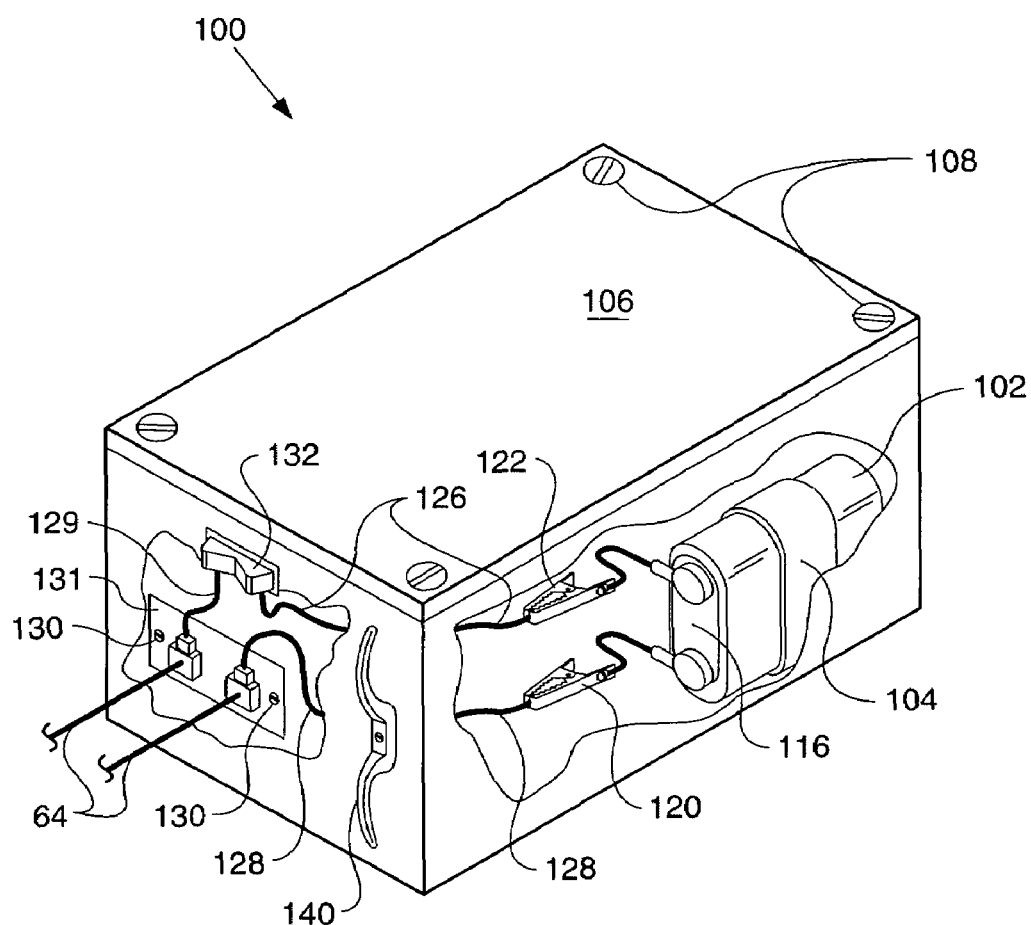
FIG. 7 is a perspective view of an illustrative power supply, with cutouts, constructed in accordance with the teachings of the present invention.

Referring now to FIG. 7, an illustrative, but nonlimiting, power supply is generally indicated by numeral 100, which is preferably child safe for indoor and outdoor usage. An illustrative housing preferably, but not necessarily, includes a housing 106, e.g., RADIO SHACK® project enclosure Model 270-1807 that is fastened by screws 108. The battery can be of any type and is preferably a standard nine (9) volt battery that is generally indicated by numeral 102 and secured in position with a battery holder 104. However, any of a wide variety of batteries will suffice in this application, e.g., 6.3 volt lantern battery, nickel cadmium battery, and so forth. The power supply 100 can be located within the birdhouse or a considerable distance away from the birdhouse. An advantage to locating the power supply away from the birdhouse is that the power supply can be protected in more environmentally favorable conditions. An alternative current power supply can also be utilized instead of a lantern.

This battery holder 104 can preferably, but not necessarily, include a VELCRO® is a federally registered trademark of Velcro Industries B.V., having a place of business at Castorweg 22-24, Curacao, Netherlands. A battery connector 116 may be utilized to provide power from the battery 102. A nonlimiting example of this illustrative type of battery connector is a RADIO SHACK® Model 270-325. Optionally, there is a pair of micro alligator clips 120 and 122, e.g., RADIO SHACK® Model 270-373B that connects to pair of wires 128 and 126. Wire utilized with the present invention is preferably, but not necessarily 22 gauge wire. Wire 126 can be connected to an on/off switch that is generally indicated by numeral 132. This preferably can include a rocker, single pole, single throw switch, e.g., RADIO SHACK® Model 275-693. From the on/off switch 132 there is a wire 129 that connects to a connector terminal 131. A nonlimiting example of a connector terminal 131 includes a speaker terminal board, e.g., RADIO SHACK® Model 274-622A that is severed in half and attached to the housing 106 by pair of screws 130. An optional rope cleat 140 may also be attached to the housing 106. From the terminal connector 131 extends the aforementioned pair of wires 64, as shown in FIG. 6. RADIO SHACK® is a federally registered trademark of TRS Quality, Inc., having a place of business at 1700 One Tandy Center, P.O. Box 17180, Fort Worth Tex. 76102.

Figure 8:
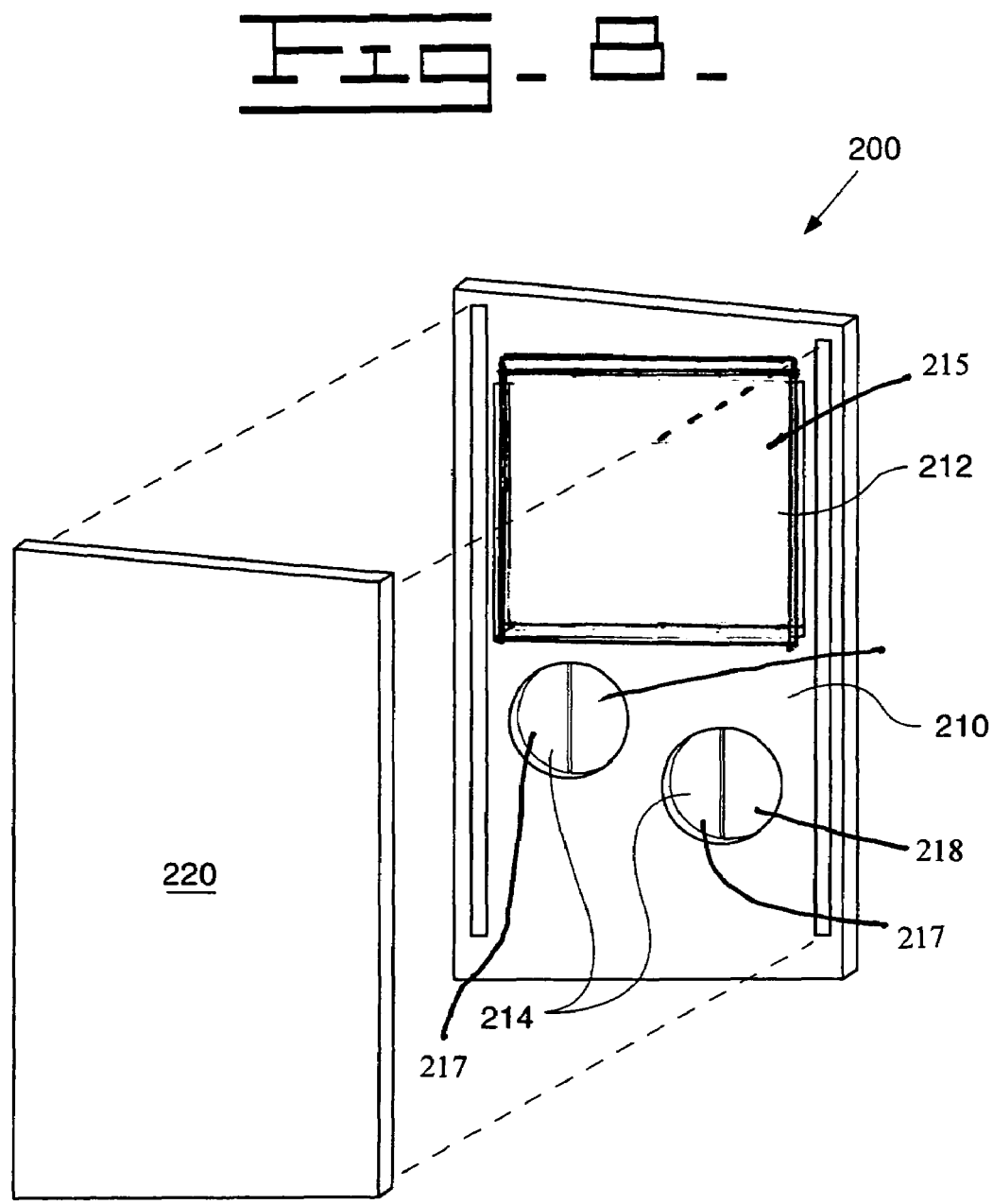
FIG. 8 is a side plan view of a third alternative embodiment of one aspect of a housing structure constructed in accordance with the teachings of the present invention.

Another alternative embodiment of one aspect of the present invention is shown in FIG. 8 and indicated generally by the numeral 200. Shown is an interior side wall 210 having an opening 212 for viewing the interior of the housing structure. Opening 212 is preferably, but not necessarily, covered with a transparent material 215. Also provided with side wall 210 are two access ports 214 for allowing access to the interior of the structure. Access ports 214 may be covered with flaps 217, 218 or other structures to prevent them from being completely open when not in use by a person accessing the interior of the housing structure.

When no one is either accessing the interior of the housing structure or viewing the animals therein through opening 212, an exterior side wall, or cover 220 is provided to cover interior side wall 210. This allows for greater comfort and security on the part of animals dwelling within the structure in that they are not alarmed by the presence of an obvious opening in the side of the structure. Exterior side wall 220 can be attached to interior side wall 210 by hinges, pins or any other suitable means of attachment. Though a side wall structure is provided in the drawings, the same principles may instead be applied to the construction of a rear wall for the housing structure. For instance, the opening provided for viewing, as well as the access ports, may be provided in an interior rear wall and an exterior rear wall may be provided to cover the openings when not in use.

FIG. 9 provides still another alternative embodiment of a side or rear wall of the present invention, designated generally by the numeral 300. This embodiment includes access ports 310 with gloves 320 attached thereto. Gloves 320 are attached to the interior of wall 300 such that a user can insert his hands through access ports 310 and into gloves 320. The user can then easily manipulate objects within the interior of the housing structure. This embodiment is particularly useful for conservationists who may wish to check, for example, eggs within the structure for hardness, or gather eggs for incubation purposes, as well as for health officials dealing with animal populations that are carriers of human disease.

A housing structure constructed in accordance with the present invention may be constructed of any suitable material. Wood is preferred, however plastics and metals and the like may also be used. The precise material used to construct a birdhouse may vary depending on the type of bird that the birdhouse is meant to attract. Likewise, the precise structure, shape and configuration of the birdhouse may also vary depending on the type of bird desired. The shape of the side wall openings, such as opening 24 described above, may be any suitable shape, including any number of fanciful configurations such as the heart shape illustrated in the above embodiment.

In each of the above embodiments, the roof or one of the side walls of the birdhouse may be detachable to allow access to the interior of the birdhouse. Thus, a birdwatcher may clean the interior of the birdhouse after each brood of nestlings has fledged. The roof or side walls may be entirely detachable or may be positioned on hinges and held closed with a clasp (not shown) that may be opened by the birdwatcher.

Thus, there has been shown and described several embodiments of a birdhouse constructed in accordance with the teachings of the present invention. Many changes, modifications, variations, and other uses and applications of the present constructions will, however, become apparent to those skilled in the art after considering this specification and the accompanying drawings. All such changes, modifications, variations, and other uses and applications which do not depart from the spirit and scope of the invention are deemed to be covered by the invention which is limited by the claims which follow.

The invention claimed is:

1. A housing structure for housing cavity-dwelling animals comprising: a floor member; opposing side outside wall members attached to said floor member and extending upwardly therefrom; a rear outside wall member attached to said floor member and extending upwardly therefrom; a front outside wall member attached to said floor member and extending upwardly therefrom; a roof portion cooperating with said front, rear and side outside wall members to form a hollow interior; at least one opening in one of said front, rear or side outside wall members communicating between an exterior of said housing structure and said interior such that an animal can enter said interior; and at least one viewing opening in one of said front, rear or side outside wall members to allow viewing of said interior from an exterior of said housing structure, wherein said viewing opening is at least substantially covered with a transparent material to allow viewing of said interior while preventing the animals therein from exiting said housing structure through said viewing opening, further comprising at least one access port in one of said front, rear or side outside wall members for accessing said interior from an exterior of said housing structure, said at least one access port having a movable covering including at least two flaps movable between a normally closed position that substantially covers the access port to an open position that allows access to the interior and that prevents said at least one access port from being completely open when not being accessed by a person, wherein said at least one access port has an opening that is configured for the user to insert his hands therethrough, that is located below said viewing opening in the same outside wall member as said viewing opening, while preventing larger animals from exiting said housing structure.

2. A housing structure for housing cavity-dwelling animals comprising: a floor member; opposing side outside wall members attached to said floor member and extending upwardly therefrom; a rear outside wall member attached to said floor member and extending upwardly therefrom; a front outside wall member attached to said floor member and extending upwardly therefrom; a roof portion cooperating with said front, rear and side outside wall members to form a hollow interior; at least one opening in one of said front, rear or side outside wall members communicating between an exterior of said housing structure and said interior such that an animal can enter said interior; and at least one viewing opening in one of said front, rear or side outside wall members to allow viewing of said interior from an exterior of said housing structure, wherein said viewing opening is at least substantially covered with a transparent material to allow viewing of said interior while preventing the animals therein from exiting said housing structure through said viewing opening, further comprising a cover portion of substantially the same size and shape as said front, rear or side outside wall member and attached thereto, further comprising at least one access port in one of said front, rear or side outside wall members for accessing said interior from an exterior of said housing structure, said at least one access port having a movable covering including at least two flaps movable between a normally closed position that substantially covers the access port to an open position that allows access to the interior and that prevents the at least one access port from being completely open when not being accessed by a person, wherein said at least one access port has an opening that is configured for the user to insert his hands therethrough, that is located below said viewing opening in the same outside wall member as said viewing opening, while preventing larger animals from exiting said housing structure.

3. A housing structure for housing cavity-dwelling animals comprising: a floor member; opposing side outside wall members attached to said floor member and extending upwardly therefrom; a rear outside wall member attached to said floor member and extending upwardly therefrom; a front outside wall member attached to said floor member and extending upwardly therefrom; a roof portion cooperating with said front, rear and side outside wall members to form a hollow interior; at least one opening in one of said front, rear or side outside wall members communicating between an exterior of said housing structure and said interior such that an animal can enter said interior; and at least one viewing opening in one of said front, rear or side outside wall members, wherein said viewing opening is at least substantially covered with a transparent material to allow viewing of said interior while preventing the animals therein from exiting said housing structure through said viewing opening; and at least one access port in one of said front, rear or side wall members for accessing said interior from an exterior of said housing structure, said at least one access port having a movable covering including at least two flaps movable between a normally closed position that substantially covers the access port to an open position that allows access to the interior and that prevents said at least one access port from being completely open when not being accessed by a person, wherein said at least one access port has an opening that is configured for the user to insert his hands therethrough, that is located below said viewing opening in the same outside wall member as said viewing opening, while preventing larger animals from exiting said housing structure.

* * * * *